Patented May 28, 1935

2,002,651

UNITED STATES PATENT OFFICE 2,002,651

METHOD OF PREPARING ACTIVATED VEGETABLE CARBONS

Leonard Wickenden, Manhasset, and John Jay Naugle, New York, N. Y.

No Drawing. Application December 27, 1933, Serial No. 704,132

5 Claims. (Cl. 252—3)

Our present invention relates to methods of preparing subdivided filtering media, particularly such as are adapted during the filtering operation to "decolorize" or otherwise purify the fluid being treated by the addition thereto of one of such media. While not limited thereto, our present invention finds particularly successful application in connection with such media derived from carbonized matter of vegetable origin, such as leached carbonized lignin residues, and particularly such matter derived from carbonaceous liquors adapted to produce by carbonization carbonized materials of the general character referred to. Our present invention aims to devise methods of the general character specified which are simple, convenient and economical to practice, and which result in filtering media of the general character specified characterized by their high rates of filtration and high decolorizing powers, and which preferably comprise a plurality of portions or fractions of different purifying, as decolorizing or colloid-adsorbing, characteristics and different porosity or filtering characteristics or factors, such fractions or portions being preferably blended or mixed together so as to yield a medium of predetermined purifying, such as decolorizing or colloid-adsorbing, characteristics and predetermined filtering characteristics best suited for the handling of a particular type of fluid with a particular type of filtering screen, cloth or the like, in a particular type of apparatus. Other objects and advantages of the methods of the present invention will in part be pointed out in detail hereinafter and will in part be obvious to those skilled in the art to which the present invention relates.

In this specification we shall describe several illustrative embodiments of the methods of the present invention. It is, however, to be clearly understood that our invention is not limited to the specific embodiments thereof herein described for purposes of illustration only. It is further to be understood that the products resulting from the practice of the aforesaid illustrative embodiments of the methods of the present invention form no part of the present invention.

Hitherto in the purification of fluids, by which we mean the removal from a fluid of a part or all of the impurity or impurities which would tend to give it color, or flavor, or to render it difficult to filter, or to render the values thereof difficult to be recovered therefrom, through crystallization or otherwise, or which would impart to such a fluid two or more of these or other undesirable qualities, it has been customary to treat such impurities, which may be termed "physical impurities" for the reason that they may be removed by physical, as distinguished from chemical, means, as one class or group, the fluid being treated as if the impurities contained therein were all of one type to be removed by similar or identical physical means. These impurities generally consist of dissolved or suspended coloring substances, dissolved or suspended odor-imparting substances, dissolved or suspended crystalline or other mineral substances, and dissolved or suspended colloidal substances, such as gums, pectins and other colloids, together with the usual mineral and organic foreign bodies, such as siliceous and cellulose substances.

To summarize this situation, these impurities, of varying properties and characteristics, have all been treated as if they comprised a single, similar or identical group of impurities, no differentiation being generally drawn between the different types of impurities contained in solution or in suspension in the fluid to be purified.

Further discussing the prior art, it is to be noted that the purifying and filtering media hitherto used were likewise actually, or in practice, treated as homogeneous and uniform substances without any differentiable or distinguishing characteristics in their various portions or fractions, which characteristics might be used to advantage for treating the various types of impurities present in the saccharine or other fluids to be purified.

Referring now to the methods of the present invention, particularly as exemplified in the aforesaid illustrative embodiments of the same, such embodiments of the methods may be briefly described as comprising a blending together or commingling of a plurality of fractions or portions of a subdivided purifying and filtering medium, such fractions or portions being characterized by different purifying, or different filtering, or both different purifying and filtering, characteristics when brought into operative contact with a fluid to be purified containing in suspension or in solution, or both in suspension and in solution, therein, different classes or types of impurities. The present invention comprehends further the proportioning of the amounts of such different fractions or portions so as to yield a, final complex or multiple purifying and filtering medium in which the components are present in amounts or proportions best calculated to remove from the fluid to be treated by means of the products resulting from the present invention just those types or classes of impurities present in such fluid and preferably requiring selective or differential treatment in order to render possible the most expeditious and economical purification of such fluid.

The products resulting from the practice of the methods of the present invention render possible such selective or differential treatment. This is for the reason that not only are the fractions or portions of subdivided purifying and filtering media making up the complex filtering medium of different degrees of fineness of subdivision, but such fractions may also vary in their factors of colloid-adsorption and decolorizing power, as well as in their factors of activity in removing other types of impurities from the liquids to be treated by such products. Furthermore, we prefer that the subdivided purifying and filtering media resulting from the practice of the methods of the present invention shall be carbonaceous, preferably by being derived from a carbonaceous material of vegetable origin. In the preferred case we prefer that the various components making up the complex purifying and filtering media resulting from the practice of the methods of the present invention shall be drived from a carbonaceous liquor, such as a liquor resulting from the treatment of ligneous material with a caustic alkali, such as caustic soda, as, for example, the soda process of manufacturing wood pulp, after which the carbonaceous liquor is carbonized, yielding a granular carbon of vegetable origin, for example, the carbonized lignin residues resulting from the carbonization of the ligneous liquor referred to and after the carbonized granular product has been leached.

In practicing the aforesaid preferred embodiments of the methods of the present invention, we prefer that the fractions or components of the final complex purifying and filtering medium shall be mingled or blended together. This may be accomplished either by preparing such fractions separately and thereafter blending or mingling them together, or by preparing such fractions simultaneously from the same material, for example, the aforesaid leached carbonized lignin residues, by grinding the granular leached carbonized lignin residues so as to yield at one and the same time different types, comprising different components, fractions or portions, of subdivided purifying and filtering media, which, being blended or mixed together, yield the final complex product resulting from the practice of the methods of the present invention.

Before proceeding further with a more specific description of the methods of the present invention, as exemplified in the aforesaid illustrative embodiments of the same, it may be desirable to point out that by the term "purify" we mean to designate such a treatment as will reduce the amount of the substance or substances present in a fluid which would tend to give it undesirable color, or undesirable flavor, or which would tend to render it difficult to recover from such fluid the values thereof, whether by crystallization or otherwise. It may further be stated here that by the term "porosity" we mean to designate the readiness with which a layer of subdivided material permits a liquid to be filtered therethrough with a given foundation, such as filter screen, cloth or paper, on which such layer of subdivided material has been deposited. It may here be stated that with different foundation materials, such as different filter screens, cloths or papers, different rates of filtration are often possible with the same purifying and filtering material.

Referring now more particularly to the aforesaid illustrative embodiments of the present invention, we may start with a raw material comprising a carbonaceous substance, preferably a carbonaceous liquid which is adapted to be carbonized to yield a carbonaceous mass, either originally granular, or which may be converted into granular condition by a suitable subdividing operation. We prefer in most cases to employ as the source of the products resulting from the practice of the present invention, a carbonaceous liquor of ligneous origin, such as the liquor resulting from the treatment of ligneous material with a caustic alkali, such as caustic soda, in the production of wood pulp by the soda process. Such a liquor, or its equivalent, may now be readily carbonized in suitable retorts, with little or no access of air, to yield an alkaline, carbonized mass in granular form which may be leached to remove therefrom the greater part of the soluble alkali carbonate or other alkaline impurities present in the carbonized mass. The woods best suited for such treatment are poplar and other hard woods, and jack pines.

The resulting carbonized granular mass, which usually contains anywhere from sixty or eighty per cent. its weight in soda, is now dumped into a leaching tank. In this condition the material may be stirred to increase the leaching action of the water in the tank. The material in the form of a slurry or suspension may now be pumped to any suitable mechanism, such as plate and frame filter presses, in which the water-soluble mineral constituents of the carbonized lignin residues or leacher refuse may be further leached or washed with water. The purpose of this step is to reduce to a minimum the mineral constituents, preferably the water-soluble and the acid soluble mineral constituents, of the carbonized lignin residues or leacher refuse. This may be readily done in the plate or frame filter presses or equivalent apparatus by passing water in any desired volume and at any desired rate of speed through the layers of the carbonized lignin residues or leacher refuse which collect on the filter media of the plate or frame filter presses or the like.

Further reduction in the percentage of the mineral content of the carbonized lignin residues or leacher refuse may be effected by passing acidulated water, such as water acidulated with one-half to two per cent., more or less, of hydrochloric acid, through the layers of carbonized lignin residues or leacher refuse, on the filter media of the plate and frame filter presses or like apparatus. The acid treatment usually reduces the mineral content of the leached residues to about 3 to 3½ per cent. in the dry state from an original content which is usually from seven to ten per cent. in the dry state.

The leacher refuse, now containing only about 3 to 3½ per cent. of ash in the dry state, but containing about seventy per cent. moisture, is suitably dried. For example, the leached residues may be dried in a direct heat dryer, in which case there will be a loss of about ten per cent. of the weight of material in the dry condition. Or else shelf driers may be used, which avoids the ten per cent. loss of the material resulting from drying the same in direct heat driers.

The leached and dried residues, with their mineral content reduced to a minimum, as to about three per cent. of their weight in the dry condition, or even less, are now suitably calcined. The purpose of the calcination step, which preferably takes place at a temperature of from about 800 to about 1000° C., generally from about 850 to about 900° C., is to burn off the fines to decompose or distil off the fraction of the leached dried residues which is more readily combustible, since this fraction is generally of little value and interferes with the proper functioning of the more valuable fraction of the carbonized leached residues. We prefer to conduct the calcination by passing electric current of regulated density directly through the mass of leached carbonized residues, preferably continuously advancing or stirring the same during the calcination step. We prefer also to conduct the calcination in the presence of air, or of steam, or of both of these agencies.

The purpose of the admission of the air is to burn off the fines or finer and more readily combustible and less valuable fraction of the material. At the same time the combustion of this fraction of the material generates useful heat in the mass being treated and thus reduces the amount of current which would otherwise be necessary for the calcination state. The purpose of the steam is to yield a more open or porous material. We prefer that the air, or the steam, or both of these agencies, where both are used, shall be added to the mass of material being treated at such pressures that the lighter and more highly activated fraction of the material shall be separated by flotation in the gases, or vapors, or both, from the heavier and less highly activated portion of the material. The more highly activated fraction will be found to be richer in carbon and poorer in mineral content, being more porous and thus lighter. Conversely, the less highly activated fraction will be found to be poorer in carbon and richer in mineral content, less porous and thus heavier.

The calcination step is generally continued from about fifteen to about sixty minutes, usually about thirty minutes only, as shown by suitable tests, when a material of the desired high degree of activation, mechanical strength, porosity and richness in carbon is obtained. The loss during the calcination step is anywhere from about twenty to about thirty-five per cent., calculated on the weight of the material in the dry condition. Due to the considerable combustion which takes place at this stage of the process, the ash content of the lighter fraction will be found to be as great as five per cent. The less activated fraction will be found to contain even more ash, often in the form of clinkers which are removable from the apparatus in which the treatment takes place, at suitable intervals.

Where, as is preferred, the ash content of the leached dry residues is about three per cent. or even less, the single calcination step combined with the subsequent acid wash hereinafter described in considerable detail will be sufficient, without other treatment, to yield a highly activated carbon having an ash content of three per cent., or even less, as two and one-half per cent., or lower still, calculated on the weight of the material in the dry condition.

However, if the ash content of the leached dry residues before calcination is substantially in excess of three per cent., based on the weight of material in the dry condition, or where a particularly active carbon is desired to be obtained, the calcined residues may be subjected to a further treatment at a temperature of from about 350° to 450° C. with exposure to the air. Such a treatment may be effected in a trough provided with electrodes for passing current of the desired density through the calcined residues. Treatment in the trough-like apparatus referred to may be continued for from about fifteen to about sixty minutes, usually about thirty minutes, until a residue in the desired condition as to mechanical strength, porosity, high degree of activation and density is obtained. We may here state that the calcination step appears to convert the material into a semi-graphitic condition in which condition, while the material is highly porous and remarkably active, having a density less than about eight pounds, and often as low as seven or even six pounds, per cubic foot, the material is not readily combustible, which enables it to be readily revivified. In what we term its semi-graphitic condition, the material has an ignition point of about 350° C. or even higher, as compared with the point of ignition of about 250° or even as low as 150° C. in the case of ordinary amorphous carbon, such as carbon obtained by the carbonization of sugar at low temperatures.

The calcined material, with or without the trough treatment referred to above, is now dumped into a tank of water, whereby it is quenched or cooled after its heat treatment or treatments. Preferably the water in the tank is acidulated so as to neutralize any residual alkaline substances present in the calcined residues. For this purpose we prefer to add to the water in the tank one per cent, or over of hydrochloric acid, enough acid being used so that the carbon after the acid wash gives a slight acid reaction. The suspension of carbon in the acidulated water is now sent to plate and frame presses for the removal of the acid waters. The material is now dried, preferably on shelf driers, to prevent its contamination and combustion, this heat treatment serving to drive off the hydrochloric acid which is of course volatile and is thus readily eliminated, after which the dried material is ground, so that substantially all of the material will pass through a twenty mesh screen and about one-half of it, or even more, will pass through a two hundred mesh screen. We find that grinding to this size considerably increases the degree of activation of the carbon and yields a more or less uniform product.

The resulting carbonized granular mass is thus reduced from its coarse granular condition to a comparatively fine powder by a suitable grinding treatment. This grinding treatment should be so conducted as to convert the coarse granules, which may be anywhere from the size of a pea, or smaller, up to the size of a walnut, or larger, to a fine powder having the physical characteristics set forth later in this specification. The grinding treatment, especially if conducted in a ball or pebble mill, results in the formation at one and the same time of a series of fractions or portions characterized by different degrees of fineness of sub-division and by different selective or differential affinities or degrees of adsorption for various types of impurities often to be met with in the treatment of fluids, for example saccharine fluids, such as sugar juices, sugar melts, syrups and molasses.

This single grinding action will, therefore, be found to bring about, by the treatment of the raw material specified, the formation of mingled or mixed fractions of subdivided filtering material. In other words, in this form of the method of the present invention, the fractions are not separately prepared and thereafter blended or mingled together, but such blending or mingling together is effected simultaneously with the formation of the fractions themselves from the raw material specified.

The resulting product, which is known to the trade as the highly activated vegetable carbon designated by the name "Suchar", consists of a variety of fractions as set forth in the following table where column "A" indicates the mesh per linear inch of the screens used to fractionate the resulting carbon; column "B" indicates the percentage by weight, of the dried carbon which the particular fraction under consideration bears to the weight of the entire mass of the carbon; column "C" designates the decolorizing power with regard to molasses of the various fractions of the carbon, considered on an arbitrary scale; column "D" indicates the time required for a given volume of a fifty per cent. washed Louisiana raw sugar solution to be filtered through filter paper, using a weight of of two per cent. of carbon based on the weight of the sugar solids contained in such solution; column "E" indicates the percentage of the total volume of such solution filtered through the filter paper with the particular fraction of carbon in the time designated; and column "F" indicates the decolorizing power of the particular fraction of carbon for a sugar solution; while the line "a" indicates the entire complex Suchar carbon without any of the fractions separated therefrom, the line "b" indicating such carbon ground to the point where all of it will pass through a screen of 150 mesh to the linear inch; the line "c" indicating the 2.2 per cent. fraction which will be retained by a screen of 40 mesh to the linear inch, the line "d" indicating the same fraction after it has been ground to pass through a screen of 150 mesh to the linear inch; the line "e" indicating the 8.4 per cent. fraction which will pass through a 40 mesh screen but will be retained by a 60 mesh screen, the line "f" indicating such fraction ground so as to pass through a 150 mesh screen; the line "g" indicating the 7.1 per cent. fraction which will pass through a 60 mesh screen but will be retained by an 80 mesh screen, the line "h" indicating this fraction ground so as to pass through a 150 mesh screen; the line "i" indicating the 9.5 per cent. fraction which will pass through an 80 mesh screen but will be retained by a 100 mesh screen, the line "j" indicating this fraction after it has been ground to pass through a 150 mesh screen; the line "k" indicating the 8.7 per cent. fraction which will pass through a 100 mesh screen but but will be retained by a 125 mesh screen, the line "l" indicating the same fraction after it has been ground to pass through a 150 mesh screen; the line "m" indicating the 1.2 per cent. fraction which will pass through a 125 mesh screen but will be retained by a 150 mesh screen; the line "n" indicating the same fraction after it has been ground to pass through a 150 mesh screen; the line "o" indicating the 9.0 per cent. fraction which will pass through a 150 mesh screen but will be retained by a 200 mesh screen; and the line "p" indicating the 53.9 per cent. fraction which will pass through a 200 mesh screen. The table follows:

TABLE I

| A | B | C | D | E | F |
|---|---|---|---|---|---|
| Mesh | Per cent on total carbon | Decolorizing value for molasses | Time of filtration | Per cent total liquor filtered | Decolorizing value for sugar solution |
|  |  |  | Seconds |  |  |
| a—Whole carbon | 100 | 144.5 | 115 | 100 | 144 |
| b—Through 150 | 100 | 150.0 | 93 | 100 | 200 |
| c—On 40 | 2.2 | 29 | 300 | | 26 |
| d—Through 150 | 2.2 | 70.9 | 127 | 100 | 134 |
| e—40–60 | 8.4 | 43.3 | 300 | 29.9 | |
| f—Through 150 | 8.4 | 55.7 | 158 | 100 | 115 |
| g—60–80 | 7.1 | 43.3 | 300 | 43.9 | 33 |
| h—Through 150 | 7.1 | 58.2 | 115 | 100 | 115 |
| i—80–100 | 9.5 | 45.4 | 300 | 43.3 | |
| j—Through 150 | 9.5 | 57.4 | 116 | 100 | 128 |
| k—100–125 | 8.7 | 59.1 | 300 | 54.3 | 44 |
| l—Through 150 | 8.7 | 62.9 | 162 | 100 | 118 |
| m—125–150 | 1.2 | 65.0 | 300 | 45.1 | |
| n—Through 150 | 1.2 | 79.6 | 175 | 100 | 134 |
| o—150–200 | 9.0 | 81.3 | 300 | 54.3 | |
| p—Through 200 | 53.9 | 216.7 | 74 | 100 | 235 |

It is, of course, to be understood that these percentages are approximate merely and may vary within considerable limits depending upon the particular raw material employed and the particular form of grinding operation used to convert the raw material into the desired condition. It is furthermore to be understood that the decolorizing values of the various fractions may likewise vary within a considerable range dependent upon the characters of these same fractions. Likewise, the times of filtration and the percentages of total liquor filtered will vary for the same causes.

It will be noted that there is what may be termed a "major" fraction of the material which will pass through a 150 mesh screen, while a "minor" fraction of the material will be retained by a 100 mesh screen, in the particular example given. Whether major or minor, these fractions are both substantial and may be defined also as a major fraction passing through a 200 mesh screen and a minor fraction retained by a 150 mesh screen, or, if a single screen is to be used as indicating the line of demarcation, a major fraction, in the example, given which will pass through a 200 mesh screen and a minor fraction which will be retained on such screen.

Bearing in mind that the rates of filtration will depend to a certain extent on the foundation material, whether screen, cloth or paper, it will be noted that the major fraction has a much higher decolorizing value both for sugar and molasses than the minor fraction, as defined above. This increased decolorizing value of the major fraction corresponds to an increased colloid-adsorption power for such fraction. The major fraction, in the example, given, where filter paper is used as the foundation material for the layer of carbon, is also characterized by a relatively high rate of filtration. In all cases it should be kept in mind that the total weight of carbon used in each instance, in the case of each fraction of the carbon, amounts to 2 per cent. of the weight of the sugar solids contained in solution, in the particular example under discussion by way of illustration merely.

We submit herewith the following tables designated as Tables II, III, IV, V and VI, Table II comprising the results of a series of tests using various amounts of that fraction of the Suchar carbon all of which passes through a 200 mesh screen, as compared with the fraction passing through a 150 mesh screen but retained by a 200 mesh screen and also with a sample of the average or complex Suchar carbon containing all of the various fractions. It will be noted, as indicated by Table II, that when a very small percentage of the "200" mesh fraction of Suchar carbon is used, the time of filtration is very high, in other words, the rate of filtration is very low. Upon increasing the percentage of this fraction of the Suchar carbon being used, the rate of filtration rapidly improves until a percentage of about 2 per cent is reached, after which there is no substantial further improvement. This indicates the desirability in the treatment of a particular fluid of using enough of the finer or high colloid-adsorbing fraction to adsorb substantially all of the colloidal matter so as to facilitate filtration.

TABLE II

*Rates of filtration on a 50% washed Louisiana raw sugar solution using various percentages of sugar which passes 200 mesh*

| Mesh | Per cent used | Time of filtration [1] | Per cent total liquor filtered [1] | Decolorizing value for sugar solution |
|---|---|---|---|---|
| Through 200 | 0.5 | 600 | 65 | 54 |
| " " | 1.0 | 123 | 100 | 88 |
| " " | 1.05 | 115 | 100 | 140 |
| " " | 2.0 | 84 | 100 | 250 |
| " " | 3.0 | 100 | 100 | 300 |
| " " | 4.0 | 85 | 100 | 484 |
| " " | 5.0 | 99 | 100 | 600 |
| 150–200 | 10.0 | 173 | 100 | Not able to read, too turbid |
| Standard Suchar | 2.0 | 117 | 100 | 100 |

[1] Filter paper used.

TABLE III

*Comparison of the rates of filtration of Suchar 150–200 mesh and through 200 mesh using a 50% washed Louisiana raw sugar solution and 2% carbon and filter cloth*

| G | H | I |
|---|---|---|
| Time of filtration | Volume from Suchar through 200 mesh | Volume from Suchar 150–200 mesh |
| 15 secs | 70 | 170 |
| 30 " | 90 | 230 |
| 45 " | 125 | 300 |
| 1 min | 150 | 370 |
| 1–30 mins | 190 | 500 |
| 2 mins | 220 | 632 |
| 3 " | 270 | |
| 4 " | 310 | |
| 5 " | 338 | |
| 6 " | 365 | |
| 7 " | 385 | |
| 10 " | 440 | |
| 15 " | 510 | |
| 19 " | 547 | |

TABLE IV

*Comparison of rates of filtration of Suchar (ground 40 mins.) and Suchar portion 150–200 mesh using a washed Cuban raw sugar solution and filter cloth*

| | J | K |
|---|---|---|
| Time of filtration | Volume from Suchar 150–200 | Volume from Suchar ground 40 mins. |
| 15 secs | 185 | 60 |
| 30 " | 310 | 85 |
| 45 " | 410 | 110 |
| 1 min | 450 (50 secs.) | 128 |
| 1–30 | | 160 |
| 2 mins | | 184 |
| 3 " | | 224 |
| 4 " | | 254 |
| 5 " | | 281 |
| 6 " | | 301 |
| 7 " | | 320 |
| 8 " | | 334 |
| 9 " | | 347 |
| 10 " | | 357 |

TABLE V

*Rates of filtration on the various portions of a granular Suchar ground 40 mins. using a 50% washed Cuban raw sugar solution and filter cloth*

| Time of Filtration | L | M | N | O |
|---|---|---|---|---|
| | Volume from Suchar on 200 mesh | Volume from Suchar 200–300 mesh | Volume from Suchar 300–350 mesh | Volume from Suchar through 350 mesh |
| 15 secs | 220 | 150 (10 secs.) | 220 | 30 |
| 30 " | 340 | | 233 (17 secs.) | 42 |
| 45 " | 440 | | | 52 |
| 1 min | 455 (47 secs.) | | | 64 |
| 1–30 | | | | 82 |
| 2 mins | | | | 95 |
| 3 " | | | | 120 |
| 4 " | | | | 141 |
| 5 " | | | | 164 |
| 6 " | | | | 180 |
| 7 " | | | | 198 |
| 8 " | | | | 210 |
| 9 " | | | | 222 |
| 10 " | | | | 236 |
| Color | Approximately 40 | Approximately 60 | Approximately 65 | Approximately 250 |

TABLE VI

*Rates of filtration of proportions of Suchar respectively retained on 200 and sifted through 350 mesh, using a 50% washed Cuban raw sugar solution prefiltered with 2.5% filter-cel. filter cloth used*

| Time of filtration | Volume from Suchar on 200 mesh | Volume from Suchar thru 350 mesh |
|---|---|---|
| 15 secs | 200 | 55 |
| 30 " | 365 | 80 |
| 45 " | 455 (40 secs.) | 98 |
| 1 min | | 115 |
| 1-30 | | 142 |
| 2 mins | | 167 |
| 3 " | | 204 |
| 4 " | | 232 |
| 5 " | | 257 |
| 6 " | | 278 |
| 7 " | | 296 |
| 8 " | | 312 |
| 9 " | | 328 |
| 10 " | | 341 |

Table III indicates the effect of using filter cloth as the foundation material instead of paper. Column "G" gives the time of filtration, column "H" giving the volume of liquor filtered through the fraction of Suchar passing through a 200 mesh screen, while column "I" gives such volume treated with Suchar passing through a 150 mesh screen but retained by a 200 mesh screen. In this case, it will be noted that the higher rates of filtration are obtained with the coarser fraction of the Suchar, a result the reverse from that obtained where filter paper, instead of filter cloth, serves as the foundation material for the layer of carbon. These comparative results would indicate that in the case of filter cloth, the finer particles of carbon apparently fill up the pores of the cloth and thus impede filtration, whereas in the case of filter paper, which is a much finer foundation material, this impediment to filtration does not arise.

In Table IV, column "J" indicates the volume of fluid filtered through the fraction of Suchar passing through a 150 mesh screen but retained by a 200 mesh screen while column "K" indicates the volume of such fluid passing through the same fraction of Suchar after the fraction has been ground for 40 minutes in a ball or pebble mill.

Table V indicates the various effects resulting from the filtration of a 50 per cent. washed Cuban raw sugar solution through those fractions of Suchar obtained by grinding for 40 minutes in a ball or pebble mill the fraction of Suchar which will originally pass through a 150 mesh screen but will be retained by a 200 mesh screen, these fractions being, respectively, the fraction which will be retained by a 200 mesh screen; the fractions which will pass through a 200 mesh screen but will be retained by a 300 mesh screen; the fraction which will pass through a 300 mesh screen but will be retained by a 350 mesh screen; and the fraction which will pass through a 350 mesh screen. In connection with this table it will be noted that here again the foundation material being filter cloth, higher rates of filtration are obtainable with the coarser fractions of the Suchar carbon, greater decolorization power, however, being obtainable with the finer fractions of the Suchar carbon.

Finally Table VI shows the comparative results with the fractions of Suchar obtained by grinding Suchar carbon about 40 minutes in a ball or pebble mill and comprising, respectively, the fraction of such ground Suchar carbon which will be retained on a 200 mesh screen and the fraction all of which will pass through a 350 mesh screen, the 50 per cent. washed Cuban raw sugar solution used in these tests having been prefiltered with a 2½ per cent. solution of "filter-cel" based on the weight of the sugar solids contained in the solution, filter cloth being used as the foundation material for the layers of carbon. Here it will be noted that a much higher rate of filtration is obtained with the coarser fraction of Suchar.

Returning now to Table I, where the line "a" the properties of the complex entire mass of carbon are set forth and in lines "c", "e", "g", "i", "k", "m", "o" and "p" the analogous properties or characteristics of the various fractions of such carbon are set forth, and with reference also, whereever necessary, to the remaining table referred to above, it will be noted that, in general, the finer fractions are characterized by increasingly greater decolorizing and increasingly greater colloid-adsorbing powers, while the coarser fractions are characterized by increasingly greater porosity or filtering power where a coarser foundation layer, such as filter cloth, is used, and by a diminishing porosity or filtering power where a relatively fine foundation material, such as filter paper, is employed as the material on which the layers of carbon are deposited. In any event, the various fractions or portions of carbon possess different purifying or filtering, also both different purifying as well as different filtering, characteristics.

Accordingly, by properly blending or mixing these different fractions in desired proportions, dependent upon the particular results desired and the particular fluids to be treated, and dependent also upon the particular foundation layer for the carbon and upon the particular apparatus in which the treatment is to take place, proportions of the various fractions may be obtained to yield predetermined results by the preparation of a complex filtering medium having the desired fractions or components in any desired predetermined proportions.

Accordingly, by means of the methods of the present invention, it is possible to prepare subdivided filtering media which are remarkably well adapted to decolorize or otherwise purify fluids by filtration by giving to the various types or classes of impurities present in such fluids a fractional or differential treatment due to the different affinities of the various fractions of the complex filtering media, resulting from the practice of the methods of the present invention, for the various types or classes of impurities present in the fluids being treated.

The methods of the present invention are furthermore characterized by their simplicity, the ease, convenience and economy with which they may be practiced, and the superiorities of the resulting products which enable very novel and very important results to be obtained in the treatment of fluids for their purification. Other advantages of the methods of the present invention will readily occur to those skilled in the art to which the present invention relates. It is important to note that that fraction of the carbon which is of the finest degree of subdivision, particularly that fraction of the carbon which passes through a 350 mesh screen and the properties of which are schematically set forth in Table V apparently possesses a much higher degree of activation and a much greater decolorizing and colloid-adsorbing power than the coarser fractions, weight for weight. This discovery constitutes one of the most important features of our present invention.

What we claim as our invention is:

1. The method of preparing a subdivided purifying and filtering medium, which comprises blending a plurality of fractions of subdivided purifying and filtering material of different degrees of fineness of subdivision, said fractions being characterized by different purifying characteristics in such proportions as to yield a subdivided purifying and filtering medium having predetermined purifying characteristics which are dependent upon the different purifying characteristics of said fractions.

2. The method of preparing a subdivided purifying and filtering medium derived from carbonized matter of vegetable origin, which comprises commingling a plurality of portions of subdivided purifying and filtering material, each of such portions being derived from carbonized matter of vegetable origin, said portions of subdivided purifying and filtering material being of different degrees of fineness of subdivision and being characterized by different purifying characteristics, and mixing such portions in such a proportion as to yield a subdivided purifying and filtering medium having predetermined purifying characteristics which are dependent upon the different purifying characteristics of said fractions.

3. The method of preparing a subdivided purifying and filtering medium derived from leached carbonized lignin residues, which comprises forming a plurality of purifying and filtering media of subdivided purifying and filtering material derived from leached carbonized lignin residues, said purifying and filtering media being characterized by different purifying characteristics, and mixing said purifying and filtering media in such proportions as to yield a complex purifying and filtering medium having predetermined purifying characteristics which are dependent upon the different purifying characteristics of said fractions.

4. The method of preparing a subdivided purifying and filtering medium, which comprises carbonizing a carbonaceous liquor of vegetable origin to yield a carbonized, granular mass and thereafter grinding such carbonized, granular mass to yield a plurality of portions of subdivided carbonaceous purifying and filtering material, said portions of subdivided purifying and filtering material being characterized by different purifying and filtering characteristics, and mixing such portions in such a proportion as to yield a subdivided purifying and filtering medium having predetermined purifying and filtering characteristics which are dependent upon the different purifying and filtering characteristics of said fractions.

5. The method of preparing a subdivided purifying and filtering medium, which comprises carbonizing a carbonaceous liquor derived from the treatment of ligneous material with a caustic alkali to yield a carbonized, granular mass and thereafter grinding such carbonized, granular mass to yield a plurality of portions of subdivided carbonaceous purifying and filtering material, said portions of subdivided purifying and filtering material being of different degrees of fineness of subdivision and being characterized by different purifying and filtering characteristics, and mixing such portions in such a proportion as to yield a subdivided purifying and filtering medium having predetermined purifying and filtering characteristics which are dependent upon the different purifying and filtering characteristics of said fractions.

LEONARD WICKENDEN.
JOHN J. NAUGLE.